Aug. 17, 1965 K. K. MAITRA 3,201,701
REDUNDANT LOGIC NETWORKS
Filed Dec. 16, 1960 9 Sheets-Sheet 1

INVENTOR.
KARUNA K. MAITRA
BY John V. Regan
Attorney

Aug. 17, 1965 K. K. MAITRA 3,201,701

REDUNDANT LOGIC NETWORKS

Filed Dec. 16, 1960 9 Sheets-Sheet 2

INVENTOR.
KARUNA K. MAITRA
BY John V. Regan
Attorney

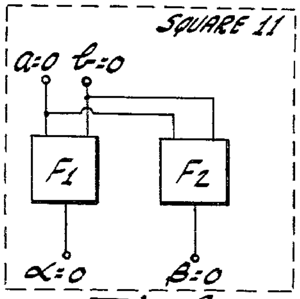
FIG. 6a.
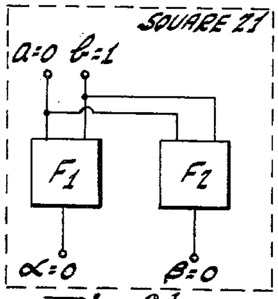
FIG. 6b.
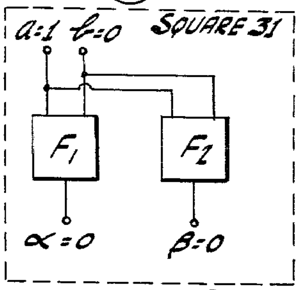
FIG. 6c.
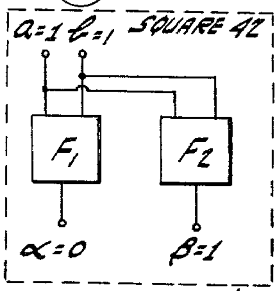
FIG. 6d.
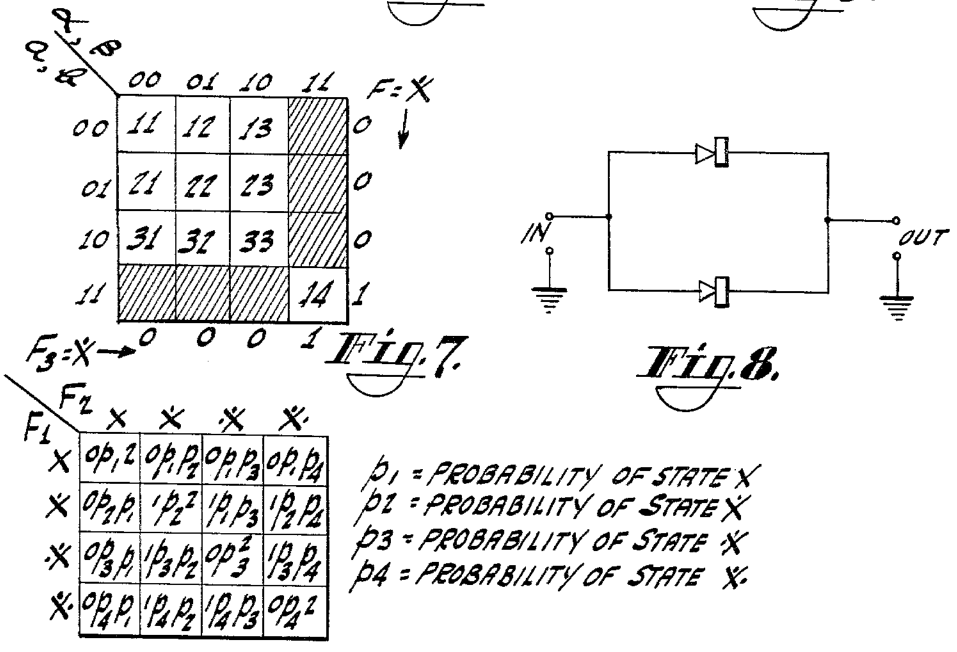
FIG. 7, FIG. 8
FIG. 9.
INVENTOR.
KARUNA K. MAITRA
BY John V. Regan
Attorney INVENTOR.
KARUNA K. MAITRA
BY John V. Regan
Attorney INVENTOR.
KARUNA K. MAITRA
BY John V. Regan
Attorney Aug. 17, 1965 K. K. MAITRA 3,201,701

REDUNDANT LOGIC NETWORKS

Filed Dec. 16, 1960 9 Sheets-Sheet 6

VARATION OF RELIABILITY Vs PROBABILITY OF OPEN CIRCUIT FAILURE OF DIODE

INVENTOR.
KARUNA K. MAITRA
BY John V. Regan
Attorney

VARIATION OF RELIABILITY VS. PROBABILITY OF OPEN CIRCUIT FAILURE OF DIODE

INVENTOR.
KARUNA K. MAITRA
BY John V. Regan
Attorney

REDUNDANT LOGIC NETWORKS

Filed Dec. 16, 1960

VARIATION OF LOG10 OF ERROR OF PERFORMANCE OF AND OPERATION VS ORDER n OF Tn(X)

INVENTOR.
KARUNA K. MAITRA
BY John V. Regan
Attorney

VARIATION OF LOG10 OF ERROR OF PERFORMANCE OF OR OPERATION Vs ORDER n Tn (※)

INVENTOR.
KARUNA K. MAITRA
BY John V. Regan
Attorney

United States Patent Office 3,201,701
Patented Aug. 17, 1965

3,201,701
REDUNDANT LOGIC NETWORKS

Karuna K. Maitra, Pittsford, N.Y., assignor to Radio Corporation of America, a corporation of Delaware Filed Dec. 16, 1960, Ser. No. 76,181
6 Claims. (Cl. 328—94)

The present invention relates to reliable logic networks and to new and improved methods for determining the reliability of logic networks.

The error free performance of engineering systems is a problem which frequently confronts the designer of a computing or, more broadly speaking, a data processing system. In general, the reliability of the overall system is critically dependent upon the error free performance of the elementary logical elements making up the system. Accordingly, there has been great stress in recent years in improving the reliability of these individual logical elements. The term "reliability" is used here in the intuitive sense, that is, uninterrupted, normal, error-free performance at all times.

The purpose of the present invention is to provide a new approach to the problem of reliability. Rather than seeking to improve the reliability of the individual logical elements by adding redundancy at the level of the elementary components inside the logic elements, this invention suggests employing the unreliable elements in the network. Each logic element is shown to have a dominant mode of operation—the one for which it is designed, and other undesired modes of operation which occur, for example, due to short or open circuits or to other failures. The unreliable elements are so arranged in a redundancy network, according to the teachings of the invention, that the probability that the network will operate in the dominant mode is much, much greater than the probability that a single element will so operate. As one example, for performing two-input logic, three logical elements, all substantially identical, are arranged in the form of a convergent tree. Two of the elements receive the same two inputs in parallel. These two elements are known as the first level of logic. The third element receives and operates on the outputs of the first two elements and is known as the second level of logic.

As will be shown below, the simple three cell "triplet" described briefly above provides a significant improvement in the reliability of such elementary basic building blocks as to input "and," "or" and other logic organs. It is also shown that further improvement in reliability may be realized by arranging the triplets themselves into networks of higher order as, for example, in triplets of triplets.

Some background material which may aid the reader in understanding where the prior art ends and where the present invention begins may be found in McCulloch et al., "Stable, Reliable, and Flexible Nets of Unreliable Formal Neurons," Quarterly Progress Report, Research Laboratory of Electronics, M.I.T., page 118, April 15, 1958, and W. S. McCulloch, "Agathe Tyche of Nervous Nets—the Lucky Reckoners," Symposium on the Mechanism of Thought Process, volume II, London 1959, page 611. These papers deal with networks of nerve cells (neurons). McCulloch postulated nerve networks made up of neurons which are in themselves unreliable. He shows that such networks can continue to perform a given logic function overall even though some of the neurons change the logic functions they perform as individuals. In other words, McCulloch shows that such networks have the property of logical "stability."

While McCulloch arbitrarily assumed certain logic states for formal, that is, imagined models of neurons in the present invention, the logic states which are possible for real, that is, practical circuits, are determined. While McCulloch demonstrated that networks of unreliable neurons could have logical stability, the present invention goes further. It shows that logical stability is not in itself sufficient to provide improved reliability. As a matter of fact, examples are given of networks with logical stability which are less reliable than the individual logic element which are part of the network. Finally, specific electrical networks of logic elements are given which do have greatly improved reliability. This is proved with the aid of new map methods of algebra which are discusssed more fully below.

The invention is described in greater detail below and is illustrated in the following drawings of which:

Figure 2:
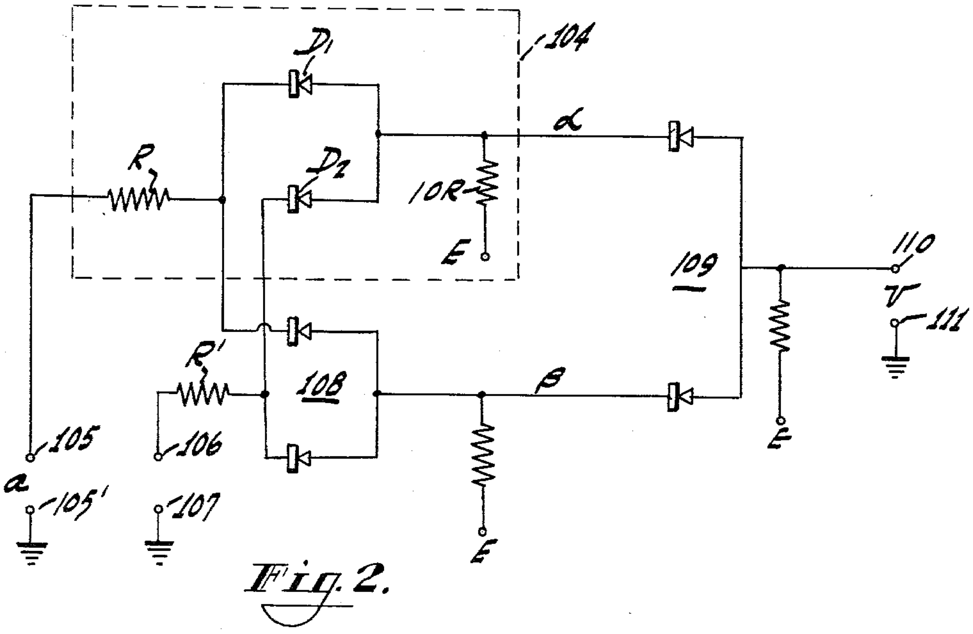
FIG. 2 is a schematic circuit diagram of a first order triplet "and" gate according to the present invention.
Figure 3:
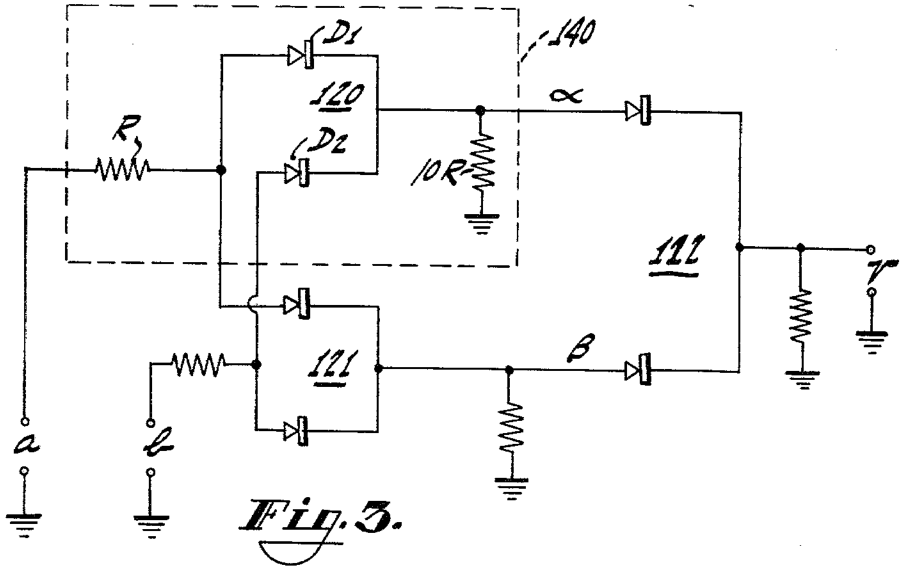
FIG. 3 is a schematic circuit diagram of a first order triplet "or" gate according to the present invention.
Figure 5A:
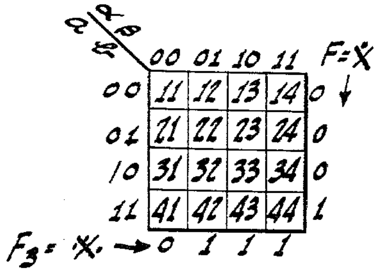
Figure 16:
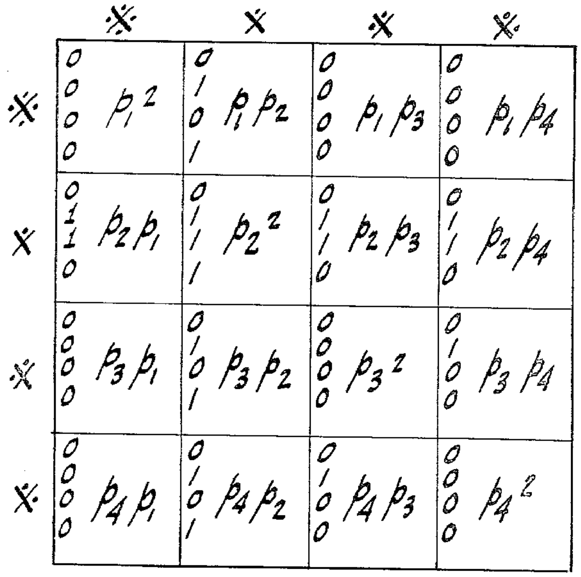
Figure 17:
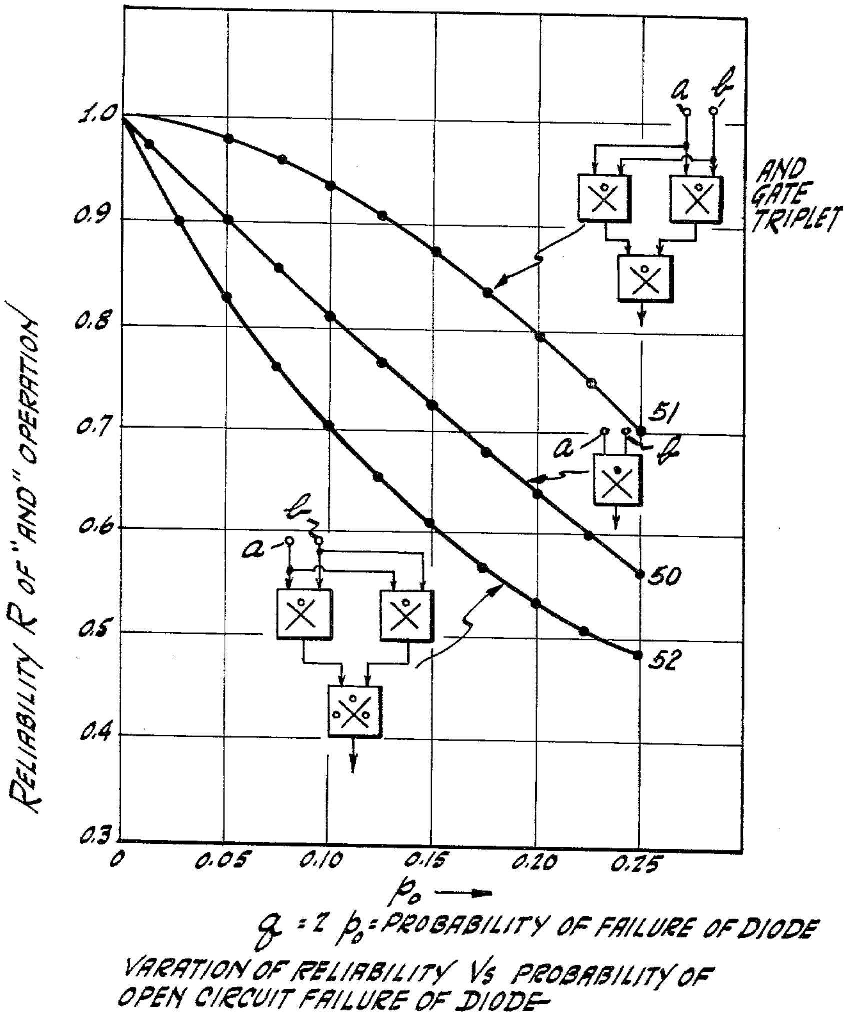
Figure 18:
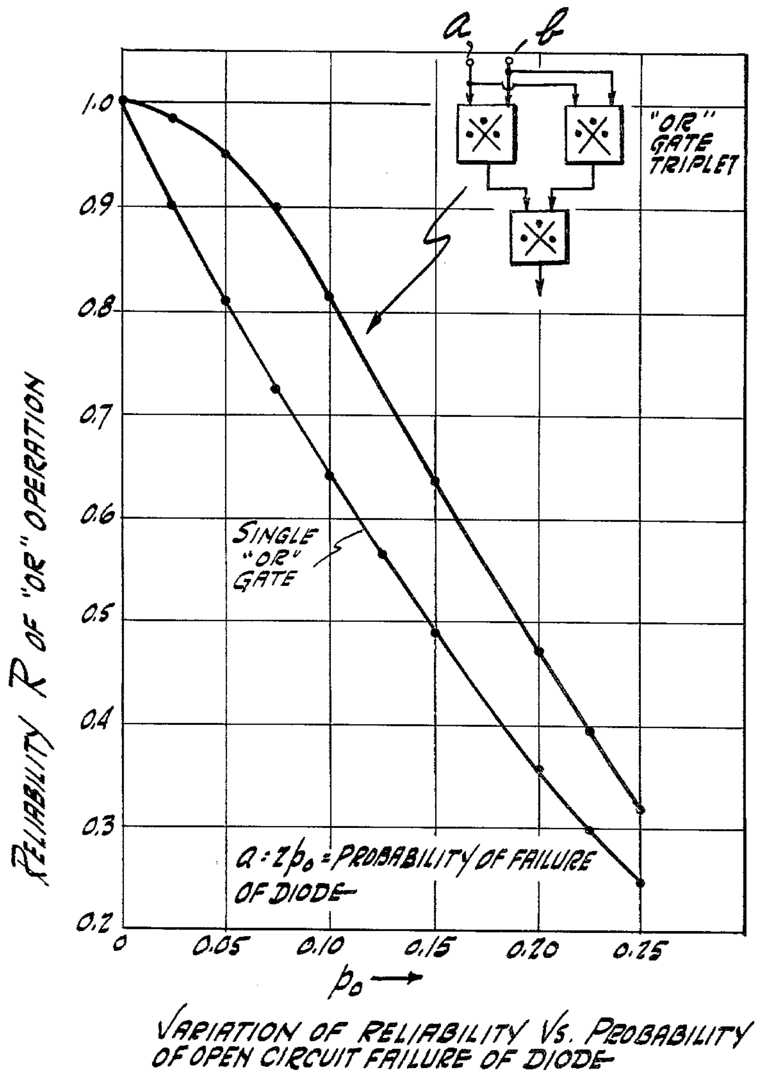
Figure 19:
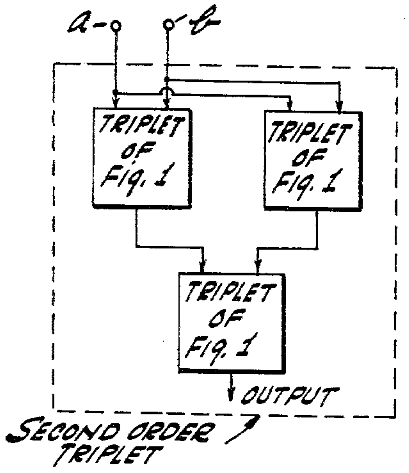
Figure 20:
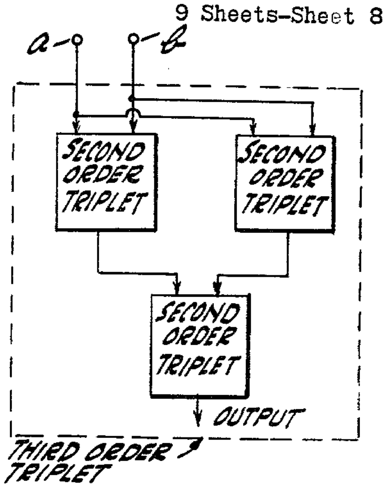
Figure 21:
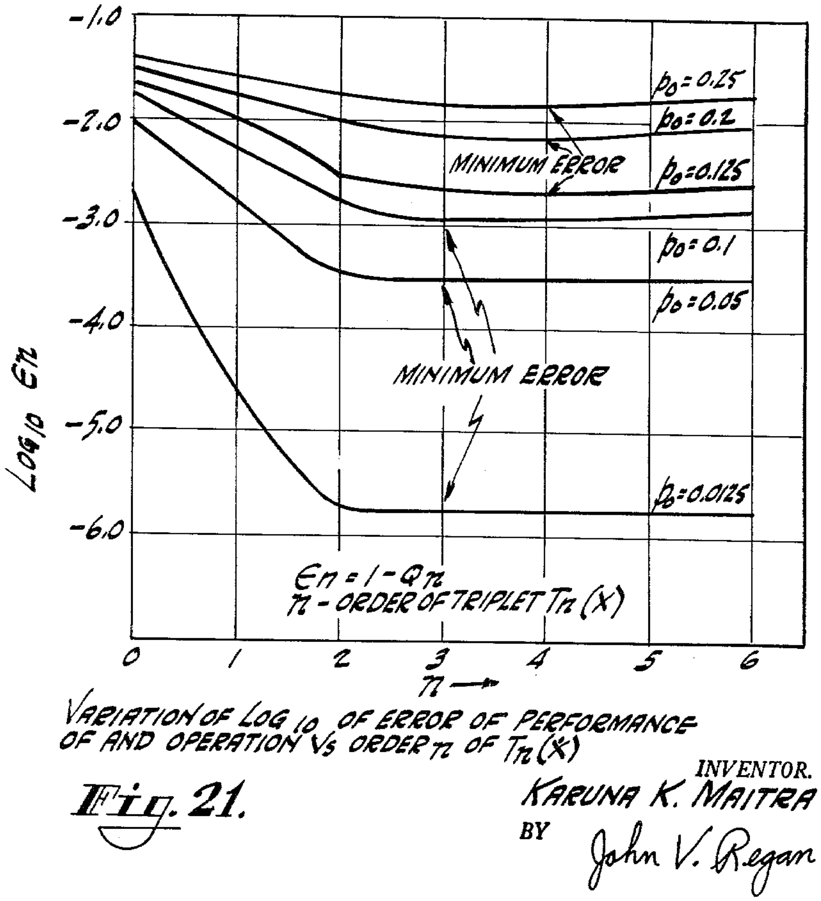
Figure 22:
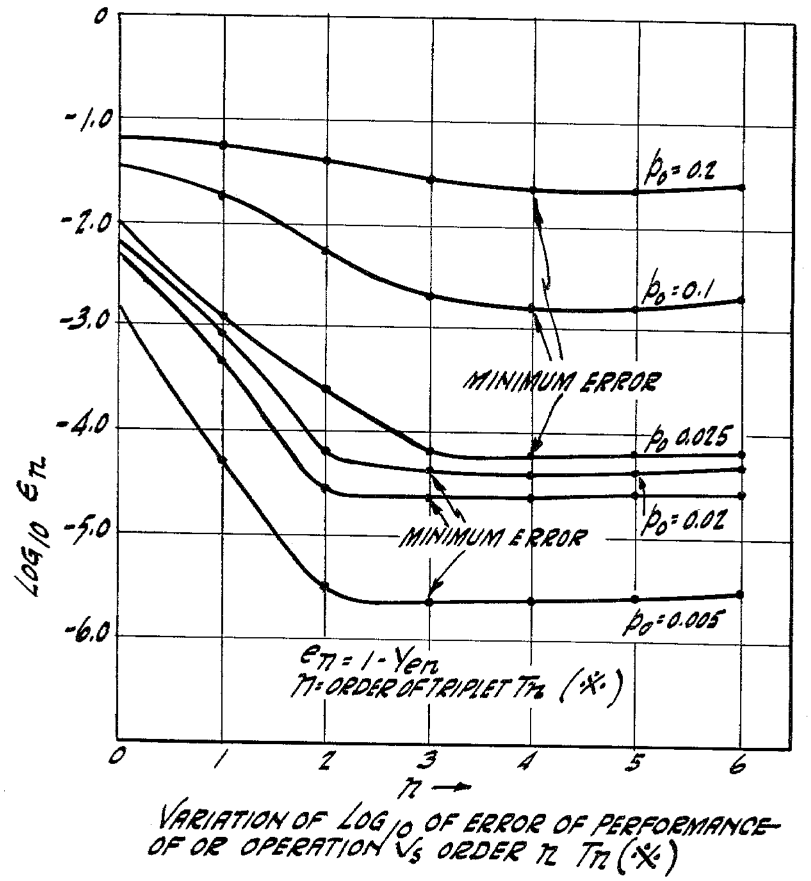

FIG. 5*a* is a two dimensional map to describe the circuit operation of a triplet network described above and FIG. 5*b* is the stability map for the circuit depicted in FIG. 5*a*;

FIGS. 6*a*–6*d* are block circuit diagrams to explain the stability maps;

FIG. 7 is a stability map of a first order triplet in which $F_3$ is an "and" element;

FIG. 8 is a schematic drawing of a parallel diode arrangement;

FIG. 9 is a reliability matrix in accordance with a new method of reliability analysis according to the present invention;

FIG. 10, FIGS. 11*a*–11*e*, FIG. 12, FIGS. 13*a*–13*e*, FIG. 14*a* and FIG. 14*b* are schematic equivalent circuit diagrams which are used to determine the logic states an elementary "and" gate of the type employed in a triple "and" gate of the invention can assume;

FIGS. 15*a*–15*d* are stability maps for the triplet "and" gate of FIG. 2;

FIG. 16 is a reliability matrix for the triplet "and" gate of FIG. 2;

FIG. 17 is a graph of reliability versus probability of open circuit failure of a diode for an elementary "and" gate, an "and" gate triplet according to FIG. 2, and a triplet consisting of two "and" gates followed by an "or" gate;

FIG. 18 is a graph of the reliability of a single "or" gate and the reliability of the triplet "or" gate according to FIG. 3;

FIGS. 19 and 20 are block circuit diagrams of higher order triplet logic networks according to the present invention;

FIG. 21 is a graph of the reliability of performance of a triplet "and" logic network as it varies with the order *n* of the triplet according to the present invention; and FIG. 22 is a graph of the reliability of performance of a triplet "or" logic network as it varies with the order *n* of the triplet according to the present invention.

GENERAL

The circuits to be discussed below are electrical in nature and receive and produce electrical signals indicative of binary digits. For the purpose of the present discussion, it is arbitrarily assumed that a positive voltage which is approximately equal to or greater than a given value E represents the binary digit "one" and a voltage which is less than the value somewhat greater than $E/2$ but definitely less than E, and ideally is "zero" represents the binary digit "zero." In order to simplify the discussion, it is sometimes stated that a binary "one" or a binary "zero" is applied to or derived from an electrical circuit rather than that a signal representing such a digit is applied to or derived from a circuit.

In the discussion which follows, binary digits are represented by small letters and also by Greek letters. These letters are sometimes arranged in Boolean equations or tables or maps as a convenient method for succinctly describing the circuit operation.

TRIPLET

Figure 1:
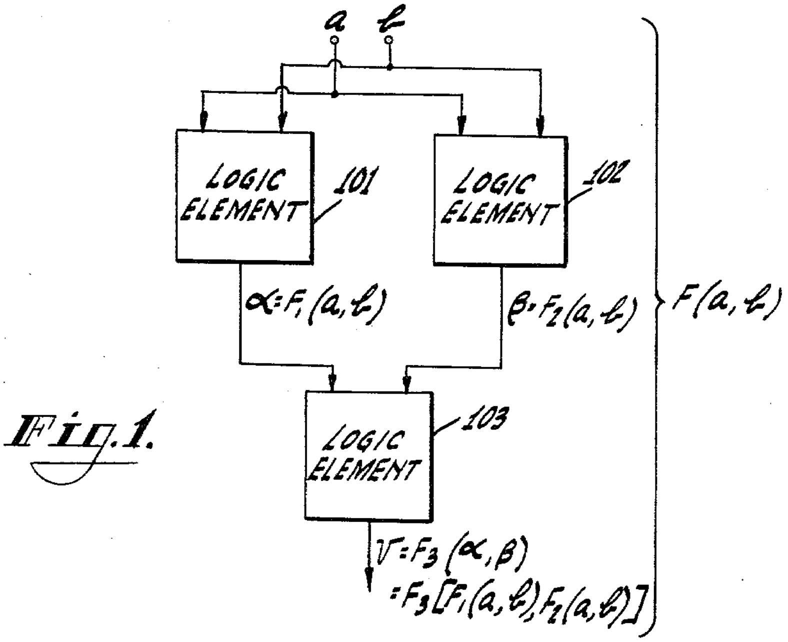
FIG. 1 is a block circuit diagram of a first order triplet logic network according to the invention. This diagram is perfectly general in the sense that any one of the logic elements in the network can assume any one of the 16 logic functions or states which are possible for two input propositions *a* and *b*.

A generalized logic network is shown in block form in FIG. 1. It consists of three logic elements 101, 102 and 103 arranged in the form of a convergent tree. Each of logic elements 101 and 102 receives input voltages indicative of binary digits $a$ and $b$. Logic element 101 produces an output voltage indicative of a binary digit $\alpha$; logic element 102 produces an output voltage indicative of a binary digit $\beta$; and logic element 103, which receives $\alpha$ and $\beta$, produces an output voltage indicative of the binary digit $\gamma$. Generally speaking, $\alpha$ is a logic function $F_1$ of $a$ and $b$; $\beta$ is a logic function $F_2$ of $a$ and $b$; $\gamma$ is a logic function $F_3$ of $\alpha$ and $\beta$; and it can be shown that the overall logic function F of the network is also a function of $a$ and $b$. The equations are:

$$\alpha=F_1(a, b) \quad (1)$$

$$\beta=F_2(a, b) \quad (2)$$

$$\gamma=F_3(\alpha, \beta)=F_3[F_1(a, b), F_2(a, b)] =F(a, b) \quad (3)$$

It has been discovered that with an arrangement like the one shown in FIG. 1, improved reliability results when each of the logical elements 101, 102 and 103 performs the same logic function. For example, the reliability of the "and" logic function can be greatly improved by employing "and" gates for each element and similarly the reliability of the "or" logic function can be greatly improved by employing "or" gates for each of the logical elements.

TRIPLET "AND" NETWORK

FIG. 2 is an embodiment of the invention designed to perform the "and" logic function. It consists of three "and" gates connected in the form of a convergent tree. Since the three gates are identical only one has reference characters applied. It is shown within the dashed block 104. This "and" gate includes a pair of diodes $D_1$ and $D_2$ which normally conduct. One of the diodes $D_1$ has an input binary quantity $a$ applied from input terminals 105, 105' and through a resistor R which represents the internal impedance of the source supplying $a$. The other diode $D_2$ has an input quantity $b$ applied from terminals 106 and 107 through a resistor of the same value as R but legended R'. The anodes of the diodes are connected through a resistor of value much larger than that of R to a source providing a power supply voltage E. For example, the value of this power supply resistor may be 10 times that of resistor R and the former is accordingly legended 10R. The output binary quantity of "and" gate 104 is $\alpha$ and the output binary quantity of the second "and" gate 108 in the first level of logic is $\beta$. These quantities $\alpha$ and $\beta$ are applied to the diodes of the "and" gate 109 in the second level of logic. The output quantity $\gamma$ of the entire network is available at terminals 110, 111.

In operation, when the input signals $a$ and $b$ represent binary "zero", diodes $D_1$ and $D_2$ both conduct and $\alpha$ and $\beta$ are both at a voltage close to ground, representing binary "zero." When one of $a$ and $b$ represents the binary digit "zero" and the other the binary digit "one," one of the diodes $D_1$, $D_2$ is cut-off and the other conducts. The conducting diode provides a low impedance path to ground through resistor R or R' and the input terminals so that $\alpha$ and $\beta$ both remain binary "zero." When $a$ and $b$ both represent the binary digit "one" (a voltage equal to E), diodes $D_1$ and $D_2$ are cut-off and the anodes of these diodes attain a voltage E representative of the binary digit "one." Thus, $\alpha$ and $\beta$ both equal "one" so that $\gamma$ is also equal to "one."

It is not self-evident from FIG. 2 that the triplet "and" gate has much greater reliability than a single "and" gate such as 104. However, the mathematical analysis which comes later will show this.

TRIPLET "OR" NETWORK

A triplet "or" network according to the present invention is shown in FIG. 3. The circuit is similar to the one of FIG. 2 except that resistor 10R is connected to ground rather than to a source of voltage E and diodes $D_1$ and $D_2$ are reversed in polarity. As in the circuit of FIG. 2, there are three gates 120, 121 and 122. However, each performs the "or" function rather than the "and" function. Diodes $D_1$ and $D_2$ are normally cut-off. In other words, when $a$ and $b$ both represent the binary digit "zero," the cathodes of the diodes are at a value close to ground representing also the binary digit "zero." When one or both of the inputs $a$ and $b$ represent the binary digit "one," one or both of diodes $D_1$ and $D_2$, respectively, conducts and a voltage develops across resistor 10R representative of the binary digit "one." When $\alpha$ or $\beta$ represents the binary digit "one," $\gamma$ also represents the binary digit "one." Here, as in the case of the circuit of FIG. 1, the improved reliability of the triplet is demonstrated below.

CHIASTIC SYMBOLS AND RULES OF ALGEBRA

In the sections which follow, the reliability of the networks of FIGS. 2 and 3 will be demonstrated. However, before this is done, it is necessary first to discuss a method of symbolic representation of two-variable propositional functions. The chiastan symbols are the same as those used by McColloch, supra.

The binary quantities $a$ and $b$ of FIGS. 2 and 3 represent two distinct propositions having independent truth values. In other words, either $a$ or $b$ can independently have the value "zero" or "one" as shown in the table below. Hereafter, when $a$ or $b$ have the value "zero," they will be designated $\bar{a}$ and $\bar{b}$, respectively.

*Table I*

| $a$ | $b$ |
|---|---|
| 0 | 0 |
| 0 | 1 |
| 1 | 0 |
| 1 | 1 |

Figure 4:
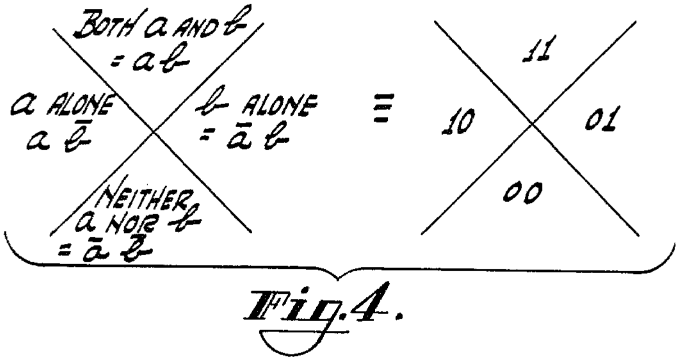
FIG. 4 is a diagram of a chiastan symbol which is used in the description as a convenient way of indicating a logic function performed by a logic element or a logic network with two inputs.

There are 16 possible truth functions which may be composed of $a$ and $b$. These are listed in Table II below. The table is self-explanatory except, perhaps, for the "Chiastan" or "chi" symbol. The term "Chiastan" or "chi" means cross-like and the cross-like symbol is a simple method for describing a logic function. There are four sectors to the cross. The upper one represents the "minterm" $ab$, that is, both $a$ and $b$; the right sector represents the minterm $\bar{a}b$, that is, $b$ alone; the lower sector represents the minterm neither $a$ nor $b$, that is, $\bar{a}\bar{b}$; and the left sector represents the minterm $a\bar{b}$, that is $a$ alone. The symbol is shown in enlarged form in FIG. 4. The presence of a dot in one of the sectors implies a truth function corresponding to the minterm allocated to that sector. For example, a dot in the upper sector represents the "and" logic symbol $ab$. A symbol with dots in more than one sector represents a truth function which is the disjunction (which includes two or more alternatives) of the corresponding minterms.

*Table II*

| Input ab | 00 | 10 | 11 | 01 | Boolean Equation | Chi Symbol | Common Name |
|---|---|---|---|---|---|---|---|
| 16 Possible Truth Functions of Propositions a, b | 0 | 0 | 0 | 0 | 0 | $X$ | Falsehood |
| | 0 | 0 | 0 | 1 | $\bar{a}b$ | $X\cdot$ | |
| | 0 | 0 | 1 | 1 | b | $\dot{X}\cdot$ | |
| | 0 | 0 | 1 | 0 | ab | $\dot{X}$ | AND |
| | 0 | 1 | 1 | 0 | a | $\cdot\dot{X}$ | |
| | 0 | 1 | 1 | 1 | a+b | $\cdot\dot{X}\cdot$ | OR |
| | 0 | 1 | 0 | 1 | $a\bar{b}+\bar{a}b$ | $\cdot X\cdot$ | Exclusive OR or Anti-Equivalence |
| | 0 | 1 | 0 | 0 | $a\bar{b}$ | $\cdot X$ | |
| | 1 | 1 | 0 | 0 | $\bar{b}$ | $\cdot\underset{\cdot}{X}$ | Negation (b) |
| | 1 | 1 | 0 | 1 | $\bar{a}+\bar{b}\equiv(\overline{ab})$ | $\cdot\underset{\cdot}{X}\cdot$ | NAND or Scheffer Stroke |
| | 1 | 1 | 1 | 1 | 1 | $\cdot\underset{\cdot}{\dot{X}}\cdot$ | Tautology |
| | 1 | 1 | 1 | 0 | $a+\bar{b}$ | $\cdot\underset{\cdot}{\dot{X}}$ | |
| | 1 | 0 | 1 | 0 | $\overline{ab}+ab$ | $\underset{\cdot}{\dot{X}}$ | Equivalence |
| | 1 | 0 | 1 | 1 | $\bar{a}+b$ | $\underset{\cdot}{\dot{X}}\cdot$ | |
| | 1 | 0 | 0 | 1 | $\bar{a}$ | $\underset{\cdot}{X}\cdot$ | Negation (a) |
| | 1 | 0 | 0 | 0 | $\overline{ab}=\overline{a+b}$ | $\underset{\cdot}{X}$ | NOR or DAGGER |

A single chi symbol represents one of the 16 possible truth functions of propositions *a* and *b*. However, a number of chi symbols together can be employed to represent a more complex logic network. For example, the logic net of FIG. 1 includes a first level of logic $F_1$, $F_2$ and a second level of logic $F_3$. The output of the second level of logic is a function of the inputs derived from the first level of logic. This may be represented by an equation in the form $$X_3[X_1, X_2]=X_4 \qquad (4)$$

where $X_4$ is the overall logic function. Since $X_4$ is only a single chi symbol, the implication is clear that the triplet of FIG. 1 produces an output which is one of the 16 possible truth functions of two propositions, even though each of the logic elements 101, 102 and 103 (FIG. 1) can itself assume any one of the 16 possible truth functions. In other words, even though there are $16^3$ permutations possible for the logic elements 101, 102 and 103, the overall logic function F can be reduced to one of the 16 functions enumerated in Table II. Equation 4 can also be written in the form $$(X_1)X_3(X_2)=X_4 \qquad (5)$$

The rules for reducing a formula of three chi symbols as in Equation 5 into an equivalent formula of only one chi symbol are stated below. These are taken from McColloch, supra. The single chi symbols like $X_1$, $X_2$ and $X_3$ are called formulas of first rank and the combined formula like that of Equation 5 is called a formula of second rank. The definitions of formulas of rank three or higher are obvious.

(1) If $X_3$ has a dot in the left sector, put a dot in $X_4$ in every sector where there is a dot in $X_1$ and no corresponding dot in $X_2$. For example, $$\underset{\cdot}{\dot{X}}_1\cdot X_3\dot{X}_2=\underset{\cdot}{X}_4 \qquad (6)$$

The way in which this is derived is as follows. The dot in the left sector of $X_3$ implies that $\alpha=1$ and $\beta=0$. $\alpha$ is the logic function generated by $X_1$. $\beta$ is the logic function generated by $X_2$. The presence of a dot in a sector of $X_1$ indicates that the logic function represented by that sector is equal to "one." Correspondingly, the absence of a dot in the same sector of $X_2$ indicates that the logic function represented by that sector is equal to "zero." Under these conditions, $X_4$ should have a dot in the same sector since this indicates that this sector of $X_4$ must represent a logic function which is equal to "one." In the illustration, since there is a dot in the lower sector of $X_1$ and no dot in the lower sector of $X_3$, there must be a dot in the lower sector of $X_4$. Furthermore, $X_4$ does not contain a dot in the top sector because of the simultaneity of dots in the top sectors of both $X_1$ and $X_2$.

(2) If $X_3$ has a dot in its right sector, put a dot in $X_4$ in every sector where there is a dot in $X_2$ and no corresponding dot in $X_1$. For example, $$\dot{X}\cdot_1 X\cdot_3\cdot X\cdot_2=\cdot X_4 \qquad (7)$$

The derivation here and in the two rules which follow is similar to that given above and need not be discussed further.

3. If $X_3$ has a dot in the upper sector, put a dot in every sector of $X_4$ where there is a dot in both $X_1$ and $X_2$. For example, $$\cdot\dot{X}\cdot_1\dot{X}_3\cdot\underset{\cdot}{\dot{X}}_2=\cdot\dot{X}_4 \qquad (8)$$

4. If $X_3$ has a dot in its lower sector, put a dot in $X_4$ in every sector that is empty in both $X_1$ and $X_2$. For example, $$\cdot X\cdot_1\underset{\cdot}{X}_3X\cdot_2=\underset{\cdot}{\dot{X}}_4 \qquad (9)$$

The rules above can be demonstrated by the following equation:

$$\underset{\cdot}{\dot{X}}_1\cdot\dot{X}\cdot_3\cdot X\cdot_2=\cdot\underset{\cdot}{\dot{X}}\cdot_4$$

It can be shown that repetition of the construction above makes it possible to produce formulas of third and high rank and to reduce them step-by-step to formulas of the first rank.

STABILITY

In some previous work it was generally assumed that if one or more of the logic elements making up a logic network ceased to produce the logic function for which it was designed, the network became inoperative. No such assumption is made in the present analysis. Instead it is assumed that each logic element is flexible in nature. The term "flexible" implies that the logic element is capable of producing more than one logic function. For example, if the logic element is an "or" gate and something occurs which no longer permits it to operate as an "or" gate, it is considered to perform some other one of the 16 possible logic combinations for two inputs. For example, a gate which normally performs a logic function such as "or" may, due to component failure, always produce a "zero" output, regardless of the values of the input quantities. This is the logic function legended "FALSEHOOD" in Table II and is represented by the chi symbol X. This reasoning holds whether the malfunction of the logic element is due to some catastrophic failures such as an open circuit or a short circuit or to some intermittent failure due, for example, to varying voltages, temperature or the like. It will be shown below that with a triplet arrangement such as described in which each of the elements of the triplet performs the same logic function, use can be made of this concept to improve circuit reliability. It will be shown that although the individual logic elements and the logic function they perform may change, the overall logic network may still be capable of yielding the desired logic operation.

A preliminary example to demonstrate the point above may now be in order. It is given in the table below. The dominant mode of operation of each of the logic elements 101, 102 and 103 of FIG. 2 is the "and" $\dot{X}$ function. The output desired is also the "and" function. The table gives nine combinations of functions $F_1$, $F_2$ and $F_3$, eight of which are different from the dominant ($\dot{X}$) logic state and still, in these nine cases, the overall function produced by the network is still the "and" function.

*Table III*

| $F_1$ | $F_3$ | $F_2$ | $F$ |
|---|---|---|---|
| $\dot{X}$ | $\dot{X}$ | $\dot{X}$ | $\dot{X}$ |
| $\dot{X}$ | $\dot{X}$ | $\cdot\dot{X}$ | $\dot{X}$ |
| $\cdot\dot{X}$ | $\dot{X}$ | $\dot{X}$ | $\dot{X}$ |
| $\dot{X}$ | $\dot{X}$ | $\dot{X}\cdot$ | $\dot{X}$ |
| $\dot{X}\cdot$ | $\dot{X}$ | $\dot{X}$ | $\dot{X}$ |
| $\dot{X}$ | $\cdot\dot{X}$ | $\dot{X}$ | $\dot{X}$ |
| $\dot{X}$ | $\cdot\dot{X}$ | $\cdot\dot{X}$ | $\dot{X}$ |
| $\dot{X}$ | $\cdot\dot{X}$ | $\dot{X}\cdot$ | $\dot{X}$ |
| $\dot{X}$ | $\cdot\dot{X}$ | $X$ | $\dot{X}$ |

Table III demonstrates that the triplet configuration has the property of "stability." This refers to the ability of a logical network made up of logical elements to produce a desired logic function even when some of the individual logical elements of the network perform logic functions other than the ones intended.

STABILITY MAPS

To determine the reliability of a network having a first level of logic $F_1$ and $F_2$, and a second level of logic $F_3$, the question should be asked—given a particular $F_3$ (one of the 16 elementary functions of the Table II), what are the possible combinations of $F_1$ and $F_2$ that will yield a desired F (the overall logic function produced by $F_1$, $F_2$ and $F_3$)? Even more broadly, one might ask the question —what are the possible combinations of $F_1$, $F_2$ and $F_3$ wherein each may be one of the 16 elementary functions of Table II which will yield a desired F? In the section which follows, a new map method is developed to answer these and several related questions.

The logic network of FIG. 1 includes three logic elements. The equations for $\alpha$, $\beta$ and $\gamma$ are Equations 1, 2 and 3. These are repeated here for convenience.

$$\alpha=F_1(a, b) \quad (1)$$

$$\beta=F_2(a, b) \quad (2)$$

$$\gamma=F_3(\alpha,\beta)=F_3[F_1(a, b), F_2(a, b)]=F(a, b) \quad (3)$$

As already mentioned, the overall logic function F for the nework is one of the 16 functions in Table II.

All of the information in Equations 1, 2 and 3 above may be represented by a two dimensional map. The map is shown in FIG. 5*a*. At the left edge of the map appear the various combinations of *a* and *b* which are possible: 00, 01, 10, 11. At the upper edge of the map appear various combinations of $\alpha$ and $\beta$ which are possible. Since *a* and *b* are each independent binary variables, $\alpha$ and $\beta$ may assume independent binary values "0" and "1." There are, therefore, 16 possible combinations of these four quantities. These are the 16 squares in the map. The squares are arranged in columns and rows. The first digit in a square refers to the row and the second digit to the column. Thus, square 23 appears in row 2, column 3.

For the purposes of the present discussion, let the overall function F to be performed by the network of FIG. 1 be the "and" function ($F=\dot{X}$). Logic elements 101 and 102 ($F_1$ and $F_2$) perform the "and" function and logic element 103 is, for the purposes of the present discussion, assumed to be designed to perform the "or" function ($F_3=\cdot\dot{X}\cdot$). The overall function F and the function $F_3$ are represented in the map of FIG. 5*a* at the right and lower edges of the map, respectively. Thus, the F or right edge of the map reads 0001 which implies that a "one" output is to be produced by the overall network of FIG. 1 only in response to an input of $a=1$ and $b=1$ and a "zero" output is to be produced in response to $a=0$, $b=0$; $a=0$, $b=1$; and $a=1$, $b=0$. In a similar manner, the 0111 appearing at the lower edge of the map beneath columns 1–4, respectively, indicates the "or" operation by the element $F_3$ on the inputs $\alpha$ and $\beta$ appearing at the top edge of the map.

The map of FIG. 5*a* enables one to determine the possible combinations of $F_1$ and $F_2$ which yield the desired output F for a given $F_3$. The area of the map from which any selection of $F_1$ and $F_2$ insures that the overall network represented by the map will produce the desired logic function (the "and" function in this particular case) is hereafter termed the "stable" region or "zone" of the map.

Equation 3 above states that $F(a, b)=F_3(\alpha, \beta)$. This implies that when $F_3=1$, $F=1$ and similarly when $F_3=0$, then $F=0$. The contradictory conditions, that is, $F_3=0$ and $F=1$ and vice versa are not permissible. This suggests that any square in the map of FIG. 5*a* corresponding to contradictory truth values of $F_3$ and F is not a permissible selection of the input combination $\alpha$, $\beta$ for the logic element 103 (FIG. 1) to perform the desired function F. All such squares therefore are not in the stable region of the map. On the other hand, the squares corresponding to identical values of F and $F_3$ are in the stable region of the map.

Figure 5B:
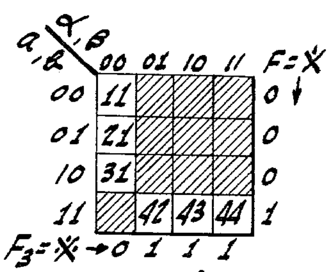

The analysis above enables one to transpose the map of FIG. 5*a* into the stability map of FIG. 5*b*. What is done is simply to cross-hatch those squares at the intersections of unidentical values of F and $F_3$ and to leave clear those squares at the intersections of identical values of F and $F_3$. The map of FIG. 5*b* includes 10 cross-hatched squares and six clear squares. The clear squares imply that any combination of $F_1$ and $F_2$ selected from the region occupied by the clear squares will provide the desired F—in this particular case, an "and" function.

In order to determine a particular pair of $F_1$ and $F_2$ which will produce the desired output function F, it is necessary to select precisely one clear square from each of the four rows. This is so since only the four combinations of *a*, *b* can completely specify the functions $F_1$ and $F_2$. In the present case it can be seen that there are a number of combinations of squares which can be chosen from the four rows. In the analysis of other circuits, it may turn out that all of the squares in a particular row are shaded. If this occurs, it means that there is no means of selecting $F_1$ and $F_2$ which can yield the desired F for the particular $F_3$.

The map of FIG. 5*b* indicates that there are three possible ways of selecting groups of four small squares in accordance with the rule above. These groups are:

| | |
|---|---|
| (1) | 11, 21, 31, 42 |
| (2) | 11, 21, 31, 43 |
| (3) | 11, 21, 31, 44 |

Following is a brief analysis to give a clearer picture of the meaning of the selection of a particular group in the stability map. The group is the first one above, namely 11, 21, 31, 42. Square 11 corresponds to $a=0$, $b=0$, $\alpha=0$ and $\beta=0$. This configuration is shown in FIG. 6*a*. Logic element 101 which performs the logic function $F_1$ and the logic element 102 which performs the logic function $F_2$ are legended $F_1$ and $F_2$, respectively, in FIG. 6*a* and also in FIGS. 6*b*, 6*c* and 6*d*, for the sake of convenience. Square 21 corresponds to $a=0$, $b=1$, $\alpha=0$, $\beta=0$. This configuration is shown in FIG. 6*b*. Square 31 corresponds to $a=1$, $b=0$, $\alpha=0$ and $\beta=0$. This configuration is shown in FIG. 6*c*. Square 42 corresponds to $a=1$, $b=1$, $\alpha=0$ and $\beta=1$. This configuration is shown in FIG. 6*d*.

With the information above, the truth tables for logic elements $F_1$ and $F_2$ may be formulated. These are given below.

TRUTH TABLE FOR $F_1$

| $a$ | $b$ | $\alpha$ |
|---|---|---|
| 0 | 0 | 0 |
| 0 | 1 | 0 |
| 1 | 0 | 0 |
| 1 | 1 | 0 |

TRUTH TABLE FOR $F_2$

| $a$ | $b$ | $\beta$ |
|---|---|---|
| 0 | 0 | 0 |
| 0 | 1 | 0 |
| 1 | 0 | 0 |
| 1 | 1 | 1 |

The truth table above indicates that $F_1=\mathrm{X}$ (the falsehood logic function of Table II) and $F_2=\dot{\mathrm{X}}$ (the "and" logic function). $F_3$ is given as $\cdot\dot{\mathrm{X}}\cdot$ (the "or" logic function). From the rules developed previously, F may be calculated as follows:

$$F=(F_1)F_3(F_2)$$

which in terms of the chi symbols reduces to $$\mathrm{X}\cdot\dot{\mathrm{X}}\cdot\dot{\mathrm{X}}=\dot{\mathrm{X}}$$

In like manner, the other two groups of squares selected from the stable zone in the map of FIG. 5*b* can be defined by the following equations.

Group 2:

$$\dot{\mathrm{X}}\cdot\dot{\mathrm{X}}\cdot\mathrm{X}=\dot{\mathrm{X}}$$

Group 3:

$$\dot{\mathrm{X}}\cdot\dot{\mathrm{X}}\cdot\dot{\mathrm{X}}=\dot{\mathrm{X}}$$

For the given $F_3=\cdot\dot{\mathrm{X}}\cdot$, there are no other combinations of $F_1$ and $F_2$ which yield the desired F. Again, it is repeated that this is indicated in FIG. 5*b* by the open and cross-hatched squares.

The method of constructing the stability map such as described above is perfectly general and applies to triplet constructed logic elements of any physical realization. One other example is given here which will be useful in the discussion which follows. In this example, the overall function F to be performed by the network of FIG. 1 is the "and" function. The logic element 103 is assumed to be an "and" logic element. The problem is to determine all the possible combinations of logical states for elements $F_1$ and $F_2$ which will enable the overall network still to produce the desired logic function F.

The stability map which solves this problem above is shown in FIG. 7. *a*, *b* and $\alpha$, $\beta$ appear at the left and top edges of the map, respectively, just as in the map of FIG. 5*a*. F, which corresponds to the "and" function, appears at the right edge of the map; $F_3$, which also corresponds to the "and" function, appears at the bottom edge of the map. Again, the squares which intersect rows and columns of equal values of $F_1$ and $F_3$ are clear and the squares which intersect unequal values of $F_1$ and $F_3$ are cross-hatched.

The map of FIG. 7 indicates that the stable region of operation includes 10 squares and the unstable region six squares. Moreover, there are 27 different combinations of $F_1$ and $F_2$ for the given $F_3=\dot{\mathrm{X}}$ which yield the desired $F=\dot{\mathrm{X}}$. The 27 stable combinations of $F_1$ and $F_2$ can be determined explicitly by the rules stated previously. It will be shown later that the greater stability indicated in the map of FIG. 7 (the greater number of clear squares) implies a greater reliability in performing the desired logic function F.

RELIABILITY

The reliability of a logic element or network is defined as the probability that the network will perform correctly at all times the logic function assigned to it by the designer. Any logic network is an interconnection of elementary components such as diodes, resistors and so on. The probability of correct operation of such a network can be computed in terms of the probabilities of failures of the individual components. This is illustrated below by the simple example of the parallel combination of two diodes shown in FIG. 8.

$p_g$=the probability that a diode will operate correctly.
$p_s$=the probability of short circuit failure of a diode.
$p_o$=the probability of open circuit failure of a diode.
$q$=the total probability of failure of a diode.

It is assumed for the purposes of this discussion that $p_g$, $p_s$, $p_o$ and $q$ are the same for each diode. It is reasonable to assume that the probability of short circuit failure is equal to the probability of open circuit failure. The behavior of each diode in the circuit of FIG. 8 can be defined by the equations:

$$p_o+p_s=2p_o=q \quad (10)$$

and $$p_g=1-q \quad (11)$$

Let $P_o$=the probability of open circuit failure of the diode combination in the circuit of FIG. 8.
$P_s$=the probability of short circuit failure of the diode combination in the circuit of FIG. 8.
$P_g$=the probability of correct operation of the circuit of FIG. 8.
$Q$=the probability of malfunction of the diode combination.

It can be verified that $$P_o=p_o^2 \quad (12)$$
$$P_s=2p_s-p_s^2 \quad (13)$$
$$P_s=2p_o-p_o^2 \quad (14)$$

since $p_s=p_o$. Therefore, $$Q=P_o+P_s=p_o^2+2p_s-p_o^2=p_o^2+2p_o-p_o^2=2p_o=q \quad (15)$$

Therefore, $Q=q$. Therefore, $P_g=1-q$, which is the same as $p_g$. It is therefore clear that in the redundant circuit arrangement of FIG. 8, which in this case is simply the parallel combination of two diodes, the reduction in $P_o$ is exactly compensated by the increase in $P_s$ and therefore $P_g$ remains the same as $p_g$. Accordingly, a simple parallel arrangement of two circuit elements does not increase the reliability of the overall circuit.

RELIABILITY MATRIX

In probabilistic logic, the functional state of a logical element or network is associated with a non-negative probability. For example, when it is said that a logic element is initially designed as an "and" gate, it implies that the probability that the element will function as an "and" gate is larger than the total probability of the various other states that the element may assume abnormal conditions. Hereafter, for the sake of simplicity, the logic operation performed by a logic element or a logic network is termed the "state" of that element or network.

Any logic element or network which is initially designed and built to perform a particular logical operation is likely to deviate into other logical states due to failure of its internal components. The probability of the occurrence of any particular logical state of a logical element or network which may be initially designed to perform a particular logic function can be computed in terms of the probability of failure of the individual components.

For the sake of the present discussion, it is assumed that the logic elements 101, 102 and 103 of FIG. 1 can be described by a given number of possible logic states they can assume and the probability of assuming each of these states. Again, to simplify the discussion, the logic elements are hereafter referred to by the logic functions they perform, namely $F_1$, $F_2$ and $F_3$ and similarly the entire network is referred to by the overall logic function performed by the network, namely F. It is desired that the overall network of FIG. 1 perform the "and" function ($F=\dot{X}$).

The first assumption that is made is that logic element 103 is a perfect "and" gate. In other words, the probability that $F_3=\dot{X}$ is "1". The logic elements 101 and 102 are not perfect logic elements. It is assumed for the purposes of the present discussion that each is capable of assuming one of four different states. These four states and the probability that an element will assume that state are listed below:

| | State | Probability |
|---|---|---|
| (1)------ | $X$ | $p_1$ |
| (2)------ | $\dot{X}$ | $p_2$ |
| (3)------ | $\cdot X$ | $p_3$ |
| (4)------ | $X\cdot$ | $p_4$ |

It may be noted here that in the more general case the states assumed by $F_1$ and $F_2$ need not be identical and moreover, the probabilities of either element assuming a given state need not be the same. Also in the more general case, $F_3$ need not be a perfect logic element but itself can assume one of a number of different logic states.

The table above shows that $F_1$ and $F_2$ can each assume one of four different states. Accordingly, there are 16 possible combinations of $F_1$ and $F_2$ which are possible and each of these combinations has a certain probability of occurring. Since $F_3$ is always an "and" gate, there are also only 16 possible combinations of $F_1$, $F_2$ and $F_3$.

In order to determine the reliability with which the network assumed above can perform the desired "and" operation, it is necessary to determine those combinations of $F_1$, $F_2$ and $F_3$ which lead to the "favorable event," namely $F=\dot{X}$. Once these individual combinations are known, the total probability of the overall network acting as an "and" gate may be evaluated simply by summing the individual conditional probabilities of the favorable combinations of $F_1$, $F_2$ and $F_3$. This, by definition, is reliability.

A reliability matrix which enables one to determine the overall reliability of the network discussed above is shown in FIG. 9. The four possible states of $F_2$ appear at the upper edge of the matrix and the four possible states of $F_1$ appear at the left edge of the matrix. The intersections of the columns and rows are squares and each of the 16 squares therefore represents one of the 16 possible combinations of $F_1$ and $F_2$. The probability of any particular combination occurring is obtained by multiplying the probabilities of the corresponding states of $F_1$ and $F_2$. For example, the probability that $F_1$ will be in state X at the same time that $F_2$ will be in state X is $p_1^2$ (see square 11 of the matrix). In a similar manner, the probability that $F_1$ will be $\cdot\dot{X}$ at the same time $F_2$ will be in state X is $p_3p_1$ (see square 31 of FIG. 9). The probabilities entered in the remaining squares of the matrix may be determined in the same way.

To review for a moment, the procedure above determines the probabilities that $F_1$ and $F_2$ will be in any particular state combination. Certain of the state combinations of $F_1$ and $F_2$ correspond to a desired output from $F_3$ and others do not. For example, if $F_1$ s $\dot{X}$ and $F_2$ is $\dot{X}$, then F is the desired logic function $\dot{X}$. On the other hand, if $F_1$ is X and $F_2$ is X, then the probability that F will be $\dot{X}$ is zero. Putting it in another way, under the conditions last-named, the probability that $\gamma$ (FIG. 1) will be a "one" when $a=1$ and $b=1$ is zero. The next step in the method of determining reliability therefore is to label those blocks in the matrix which can produce the desired output function $F=\dot{X}$ and those which cannot produce the desired result. Those which can produce the desired result will be legended with a prefix of "one" and those which cannot will be legended with a prefix of "zero." The stability map of FIG. 7 which it should be remembered is one for a triplet like the one of FIG. 1 in which $F=\dot{X}$ and $F_3=\dot{X}$ enables one to determine these co-efficients.

An example of how the above is done is as follows. It is noted that square 24 of FIG. 7 is shaded. This implies that $\alpha$, the output of $F_1$, and $\beta$, the output of $F_2$ cannot both be "one" at the same time (the fourth column of the map of FIG. 7 is 11) when $ab$, the input to the network, is 01 (the second row of the map is 01). This input corresponds to the input minterm $\bar{a}b$. This may be represented by the chi symbol $X\cdot$. Now, if $F_1=X\cdot$, then $\alpha=1$ and if $F_2=X\cdot$, then $\beta=1$ (by definition). If $\alpha=1$ and $\beta=1$, then $\gamma=1$ since $F_3$ is a perfect "and" gate. But this is not the proper operation for an "and" network since when $a=0$ and $b=1$, $\gamma$ should equal "zero" and not "one." Accordingly, $F_1=X\cdot$ at the same time that $F_2=X\cdot$ is not a permitted combination which will still allow the overall network to produce the "and" function. Therefore, the square of the reliability map of FIG. 9 corresponding to this network should have a prefix "zero."

Referring now to the reliability matrix, it will be seen that square 44 corresponds to $F_1=\dot{X}\cdot$ and $F_2=\dot{X}\cdot$. These two states have in common $X\cdot$ and since this is not permitted, square 44 must have a prefix of "zero."

In order to determine the "zero" coefficients of the other squares of the reliability matrix of FIG. 9, every cross-hatched square in the stability matrix of FIG. 7 is examined in a systematic manner and the information thereby obtained is transferred to the reliability matrix. The procedure is as follows starting with row 1.

(1) Square 14 of the stability map of FIG. 7 is cross-hatched implying that $F_1$ and $F_2$ cannot both have an output "one" at the same time for the input combination $ab=00$. This means that the chi symbols for $F_1$ and $F_2$ cannot both be X. However, in the reliability matrix of FIG. 9, none of the symbols of $F_1$ and $F_2$ are $\dot{X}$ so that square 14 of the stability map of FIG. 7 does not convey any pertinent information.

(2) Square 24 of the stability map has already been discussed. This produces a "zero" prefix in square 44 of reliability matrix of FIG. 9.

(3) Square 34 of the stability matrix is cross-hatched implying that $F_1$ and $F_2$ cannot both have an output "one" in response to an input $ab$=10. In terms of chi symbols $F_1$ and $F_2$ cannot both be ·X at the same time. Square 33 of the reliability map of FIG. 9 does correspond to this undesired condition and therefore must have a prefix "zero."

(4) Square 41 of the stability map is cross-hatched implying that $F_1$ and $F_2$ cannot both have the output "zero" at the same time when the input combination $ab$=11. In terms of chi symbols, this means that $F_1$ and $F_2$ cannot both have a dot missing from the upper sector at the same time. Accordingly, square 11 of the reliability matrix of FIG. 9 has a prefix "zero."

(5) Square 42 of the stability map is cross-hatched implying that $F_1$ cannot be "zero" at the same time that $F_2$ is "one" when the inputs to $F_1$ and $F_2$, respectively are 11. This suggests that the chi symbol for $F_1$ without a dot in the top sector cannot be combined with the chi symbol for $F_2$ with a dot in the top sector. Squares 12, 13 and 14 of the reliability matrix of FIG. 9 correspond to this undesired combination and accordingly these squares must have the prefix "zero."

(6) Square 43 of the stability map is cross-hatched implying that $F_1$ cannot have an output "one" at the same time that $F_2$ as an output "zero" when the inputs to $F_1$ and $F_2$ are 11. This implies that the chi symbol for $F_1$ cannot have a dot in the top sector at the same time that the chi symbol for $F_2$ has no dot in its top sector. Squares 21, 31 and 41 of the reliability matrix of FIG. 9 correspond to these undesired combinations and therefore have a "zero" prefix.

This completes the construction of the reliability matrix of FIG. 9. Seven of the squares are favorable to the desired event, namely the overall function $F=\dot{X}$ and nine of the squares in the matrix are unfavorable. The reliability of the overall network may be determined by summing the conditional probabilities of the occurrences of the combinations of $F_1$ and $F_2$ and $F_3$ that result in $F=\dot{X}$. Let H equal the total probability that the network will act as an "and" gate.

Then $$H=p_2^2+p_2p_3+p_2p_4+p_3p_2+p_3p_4+p_4p_2+p_4p_3$$

which reduces to $$H=p_2^2+2p_2p_3+2p_2p_4+2p_3p_4 \quad (16)$$

In the example above, $F_3$ is assumed to have only one state and the probability that the state will occur is "one." Accordingly, the probability function H depends on the probabilities that $F_1$ and $F_2$ will assume certain of their states. As already mentioned, in the more general case, the probability that $F_3$ will assume any given state such as $\dot{X}$ is less than one. In this more general case, therefore, the equation for H will have to take into account a factor $p_5$ where $p_5$ is the probability that $F_3$ will assume a state which will result in the overall function $F=\dot{X}$ for various combinations of $F_1$ and $F_2$. The factor $p_5$ would be multiplied with H to obtain the true probability of proper circuit operation.

In the general case in which element $F_3$ may have a number of different states, each with a probability $p_x$, one can construct separate reliability matrices, one for each state of $F_3$. For example, suppose $F_3$ can assume one of four different states. To determine the overall reliability of the network, four different stability matrices would have to be constructed, one for each possible state of $F_3$.

In a similar manner, either four different reliability matrices or a single reliability matrix in which four times the amount of information was included would have to be constructed. Details are given later.

RELIABILITY OR "AND" GATE TRIPLET OF FIG. 2

The principles set forth above permit one to determine the reliability of any logical network of the triplet type. These principles are applied in this section to the determination of the reliability of the "and" gate triplet of FIG. 2 and in a following section to the determination of the reliability of the "or" gate triplet of FIG. 3. In each case, the following information must be obtained.

(1) The number of logic states which are possible for each elementary logic element in the network. In the circuit of FIG. 2, the elementary logic element is the two diode "and" gate shown within the dashed block 104.

(2) The probability that the elementary logic element such as "and" gate 104 will assume a particular state.

(3) The combinations of states which are possible in the overall logic network. In the example chosen if, as will actually be shown to be the case later, there are four states possible for each "and" gate and there are three such gates in the triplet, then the number of combinations of states which are possible are $4^3$ or 64.

(4) The particular ones of the combinations above which produce the desired overall function. In this particular case the number of combinations which produce the overall "and" function $F=\dot{X}$.

(5) The total probability that the desired combinations above, that is, the combinations which produce the overall "and" function will occur.

In the analysis which follows, it is assumed that the resistors have a reliability of "one," that is, that they are extremely unlikely to fail. Each diode may be in one of three conditions. Normally the diode operates properly and this condition is labeled "$g$." The diode may be open circuited and this condition is labeled "$o$"; the diode may be short circuited and this condition is labeled "$s$." Of course, as is shown in the equations later, the probability that the diode is operating properly is very much greater than that of its being open circuited or short circuited. It is assumed that the probability of a diode becoming short circuited is equal to that of a diode becoming open circuited.

A source voltage for the "and" gate is a voltage having a value E. A binary "one" is represented by a voltage having a value of E or close to E. A binary "zero" is represented by a voltage having a value between about "zero" and $$\frac{12}{21}E.$$

The diodes $D_1$ and $D_2$ in the "and" gate 104 of FIG. 2 may assume the conditions listed below.

| | $D_1$ | $D_2$ |
|---|---|---|
| (1) | g | g |
| (2) | g | o |
| (3) | g | s |
| (4) | o | g |
| (5) | s | g |
| (6) | o | o |
| (7) | s | s |
| (8) | s | o |
| (9) | o | s |

Following is an analysis of these conditions with paragraph numbers corresponding to those in the table above.

(1) Both diodes operate properly ($g$, $g$). Under these conditions, the "and" gate functions as an "and" gate so that $F_1=\dot{X}$. The legend "$F_1$" is adopted from FIG. 1.

(2) Diode $D_1$ is operating properly and diode $D_2$ is open circuited $(g, o)$. Under these conditions, the circuit of block 104 in FIG. 2 reduces to the one shown in FIG. 10. In this circuit and in the ones that follow, numbers have been assigned to the resistors so that the equivalent circuits can more easily be traced. The resistor 130 is in series with the A input. The resistor 132 (see FIG. 11 and others) is in series with the B input. Resistor 131 is in series with the power supply voltage E. Resistors 130 and 132 have a value R and resistor 131 has a value 10R.

Figures 10, 11A, 11B, 11C, 11D, 11E, 12, 13A, 13B, 13C, 13D, 13E, 14A, 14B:
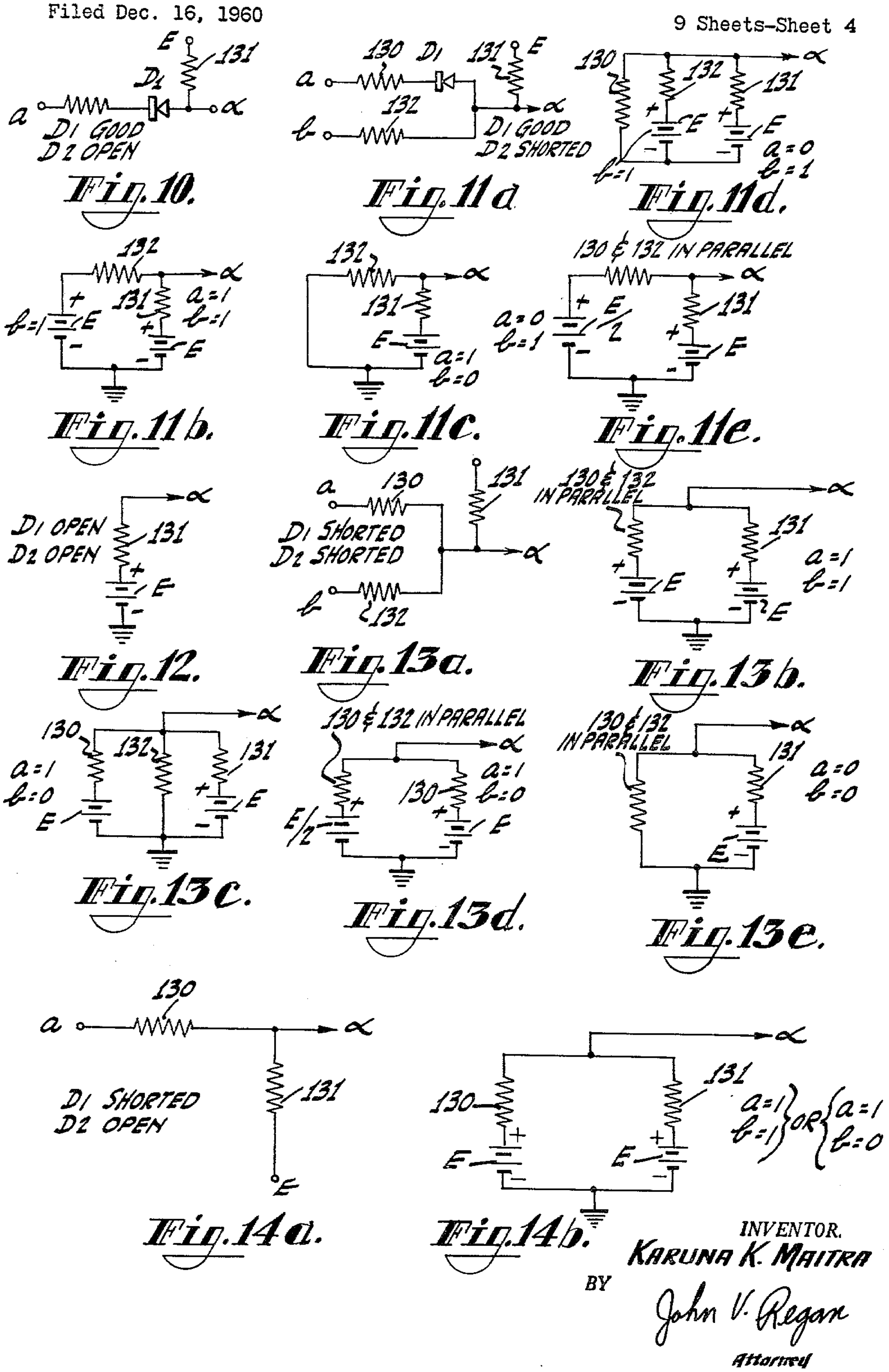
Figures 15A, 15B, 15C, 15D:
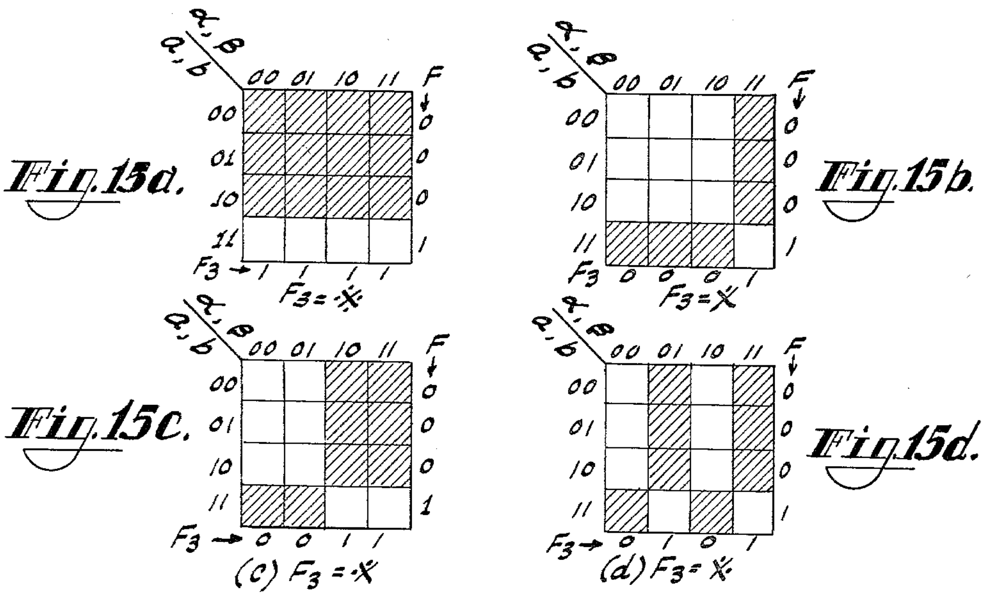

It can easily be seen from the circuit of FIG. 10 that when $E_a$ (the input voltage) is equal to E, diode $D_1$ is cut-off and $E_\alpha$ (the output voltage) is equal to E. In binary terms when $a=1$, $\alpha=1$ regardless of the value of $b$. The Boolean equation for the circuit is:

$$\alpha=ab+a\bar{b}$$

Accordingly, $F_1=\cdot X$.

(3) Diode $D_1$ is operating properly and diode $D_2$ is short circuited $(g, s)$. Under these conditions, the equivalent circuit is as shown in FIG. 11*a*. However, in order to determine the logic function produced by this circuit, it is necessary to see what occurs for the different input combinations of *ab*.

When the binary inputs are $a=1$ and $b=1$ $$(E_a=E_b=E)$$

the equivalent circuit of FIG. 11*a* becomes the one shown in FIG. 11*b*. Diode $D_1$ is cut-off so that resistor 130 does not appear in the circuit. It may be observed from FIG. 11*b* that $$E_\alpha=E\cdot\frac{R}{R+10R}+E\cdot\frac{10R}{R+10R}=E$$

Accordingly, when $a=1$ and $b=1$, $\alpha=1$.

The circuit of FIG. 11*b* assumes that a binary "one" input is equal to or greater than E, the supply voltage. However, it might be mentioned that the circuit is also operative when the binary inputs $a$ and $b$ are represented by voltages somewhat less than E. Under the latter conditions, the equivalent circuit is slightly different but it can be shown that the output voltage $E_\alpha$ is also approximately equal to E so that $\alpha=1$.

When the inputs are $a=1$ and $b=0$, the equivalent circuit becomes the one shown in FIG. 11*c*. This circuit indicates that diode $D_1$ is open so that resistor 130 is out of the circuit and accordingly resistor 132 is effectively in series with the power supply and resistor 131. The equation describing the output voltage $E_\alpha$ is $$E_\alpha=E\cdot\frac{R}{R+10R}=\frac{E}{11}$$

A binary "zero" has previously been defined as a voltage between "zero" and roughly $E/2$ so that it may be said that the inputs $a=1$ and $b=0$ correspond to an output $\alpha=0$.

When $a=0$ and $b=1$, the equivalent circuit becomes the one shown in FIG. 11*d*. The circuit of FIG. 11*d* may be simplified by Thevenin's theorem to the one shown in FIG. 11*e*. The output voltage $E_\alpha$ for this circuit is $$E_\alpha=\frac{E}{2}\cdot\frac{10R}{10R+\frac{R}{2}}+E\cdot\frac{\frac{R}{2}}{10R+\frac{R}{2}}=\frac{11}{21}E$$

A binary "zero" has been previously defined as a voltage somewhat greater than $E/2$. In practice, the threshold for binary "zero" (the bias setting for the stage following the triplet) may be made somewhat greater than $$\frac{11}{21}E$$

and may be, for example, $$\frac{3}{4}E$$

Accordingly, it is concluded that when $a=0$ and $b=1$, $\alpha=0$.

When $a=b=0$, the equivalent circuit becomes merely a voltage divider and the output voltage $E_\alpha$ is taken from across a resistor in the divider having an equivalent value of $$\frac{R}{2}$$

The other element of the voltage divider of the resistor having a value 10R so that the output voltage is about $$\frac{1}{20}E$$

which represents the binary digit "zero."

The foregoing analysis permits the truth table for the circuit (the circuit in which diode $D_1$ is operating properly and $D_2$ is short circuited) to be drawn.

| a | b | α |
|---|---|---|
| 0 | 0 | 0 |
| 0 | 1 | 0 |
| 1 | 0 | 0 |
| 1 | 1 | 1 |

From the truth table above, it is clear that even though one of the diodes is short-circuited, the "and" gate continues to perform the "and" function $F_1=\dot{X}$.

(4) Diode $D_1$ is open circuited and diode $D_2$ is operating properly $(o, g)$. It is clear that this case is the same as the one discussed in paragraph (2) above except that the diodes are interchanged. It can therefore readily be seen that the logic function performed under these conditions is $\alpha=ab+\bar{a}b$; $F_1=\dot{X}\cdot$.

(5) Diode $D_1$ is short circuited and diode $D_2$ is operating properly $(s, g)$. The circuit operation is identical to that of (3) above except that the diodes have been reversed. The Boolean equation is $\alpha=ab$; $F_1=\dot{X}$.

(6) Diodes $D_1$ and $D_2$ are both open $(o, o)$. Under these conditions the equivalent circuit is the one shown in FIG. 12. It is apparent from the circuit that regardless of the values of $a$ and $b$, the output produced is always $\alpha=1$. The logic function is described by the chi symbol $\cdot\dot{X}\cdot$.

(7) Diodes $D_1$ and $D_2$ are both short circuited $(s, s)$. Under these conditions, the equivalent circuit is as shown in FIG. 13*a*. It is now necessary to determine the circuit behavior for different combinations of the input quantities *ab*.

When $a=b=1$, the equivalent circuit becomes the one shown in FIG. 13*b*. The equation for $E_\alpha$ is $$E\cdot\frac{10R}{10R+\frac{R}{2}}+E\cdot\frac{\frac{R}{2}}{10R+\frac{R}{2}}=\frac{20}{21}E+\frac{E}{21}=E$$

From the above it is clear that when $a=1$ and $b=1$, then $\alpha=1$.

When $a=1$ *and* $b=0$, the equivalent circuit is the one shown in FIG. 13*c*. This can be simplified to the circuit shown in FIG. 13*d*. From the latter the output voltage $E_\alpha$ is $$E_\alpha=\frac{E}{2}\cdot\frac{10R}{10R+\frac{R}{2}}+E\cdot\frac{\frac{R}{2}}{10R+\frac{R}{2}}=\frac{11}{21}E$$

As already mentioned, $$\frac{11}{21}E$$

represents the binary digit "zero" so that when $a=1$ and $b=0$, $\alpha=0$.

When $a=0$ and $b=1$, the circuit is the same as the one shown in FIG. 13*d* and $\alpha=0$.

When $a=0$ and $b=0$, the equivalent circuit becomes the one shown in FIG. 13*e*. The output voltage is $$E_\alpha=E\cdot\frac{\frac{R}{2}}{10R+\frac{R}{2}}$$

Thus, when $a=0$ *and* $b=0$, $\alpha=0$.

The truth table for the circuit with both diodes short circuited is:

| a | b | α |
|---|---|---|
| 0 | 0 | 0 |
| 0 | 1 | 0 |
| 1 | 0 | 0 |
| 1 | 1 | 1 |

Thus, it is clear that the circuit performs the "and" function $F_1=\dot{X}$.

(8) Diode $D_1$ is short circuited and diode $D_2$ is open circuited (*s*, *o*). When diode $D_1$ is short circuited and diode $D_2$ is open circuited, the equivalent circuit becomes the one shown in FIG. 14*a*. When $a=b=1$ or when $a=1$ and $b=0$, the equivalent circuit becomes the one shown in FIG. 14*b*. The output voltage $E_\alpha$ in either case is $$E\cdot\frac{10R}{10R+R}+E\cdot\frac{R}{R+10R}=E$$

Accordingly, $\alpha=1$ when $a=1$ and $b=1$ or when $a=1$ and $b=0$.

When $a=0$ and $b=1$ or when $a=0$ *and* $b=0$, then the output voltage $E\alpha$ is $$\frac{E}{11}$$

and represents the binary digit "zero." From the above it is easily seen that the logic function performed by the circuit with diode $D_1$ and diode $D_2$ open is $a=a\bar{b}+ab$; $F_1=\cdot\dot{X}$.

(9) When diode $D_1$ is open circuited and diode $D_2$ is short circuited, the analysis is similar to that given for (8) above except that diodes are reversed. The logic function performed is $F_1=\dot{X}\cdot$.

The table below lists the states which are possible for each of the two diodes in an "and" gate and the probability that that state will occur.

| | $D_1$ | $D_2$ | $F_1$ | Probability p |
|---|---|---|---|---|
| (1)------ | g | g | $\dot{X}$ | $(1-p_s-p_o)^2$ |
| (2)------ | g | o | $\cdot\dot{X}$ | $p_o(1-p_s-p_o)$ |
| (3)------ | g | s | $\dot{X}$ | $p_s(1-p_s-p_o)$ |
| (4)------ | o | g | $\dot{X}\cdot$ | $p_o(1-p_s-p_o)$ |
| (5)------ | s | g | $\dot{X}$ | $p_s(1-p_s-p_o)$ |
| (6)------ | o | o | $\cdot\dot{X}\cdot$ | $p_o^2$ |
| (7)------ | s | s | $\dot{X}$ | $p_s^2$ |
| (8)------ | s | o | $\cdot\dot{X}$ | $p_op_s$ |
| (9)------ | o | s | $\dot{X}\cdot$ | $p_op_s$ |

To review for a moment, a $p_o$ in the table is the probability of a diode becoming open circuited; $p_s$ is the probability of a diode becoming short circuited, $p_s=p_o$. It may be seen in the $F_1$ column that an "and" gate can asume only one of four different states, namely $\cdot\dot{X}\cdot$; $\dot{X}$; $\cdot\dot{X}$; and $\dot{X}\cdot$. In order to determine the probability that the "and" gate is in a particular state, the probabilities for each state occuring must be added. For example, in order to determine the probability that an "and" gate is in the state $\dot{X}$, the probabilities for items (1), (3), (5) and (7) must be added. In the equations which follow, Let $p_1$=the probability that a logic element is in state $\cdot\dot{X}\cdot$;

Let $p^2$=the probability that a logic element is in state $\dot{X}$;

Let $p_3$=the probability that a logic element is in state $\cdot\dot{X}$; and

Let $p_4$=the probability that a logic element is in the state $\dot{X}\cdot$.

If the pertinent equations are added and $p_o$ is substituted for $p_s$, the following equations are obtained:

$$p_{\cdot\dot{X}\cdot}=p_1=p_0^2 \tag{17}$$

$$p_{\dot{X}}=p_2=(1-p_0)^2 \tag{18}$$

$$p_{\cdot\dot{X}}=p_3=p_0(1-p_0) \tag{19}$$

$$p_{\dot{X}\cdot}=p_4=p_0(1-p_0) \tag{20}$$

There is now sufficient information to draw the stability maps for the triplet "and" gate of FIG. 2 which corresponds to the different possible states of each elementary "and" gate. It will be recalled that the desired overall function is $\dot{X}$. The most probable states of $F_1$, $F_2$ and $F_3$ are $\dot{X}$. Since $F_3$ can assume one of four different possible logic states, four stability maps are required. These are shown in FIGS. 15*a* through 15*d*

The stability maps enable the reliability matrix of FIG. 16 to be drawn. The method has already been discussed in detail. The matrix of FIG. 16 covers the 64 different possible combinations of logic elements $F_1$, $F_2$ and $F_3$. Each square in the matrix of FIG. 16 includes a column of binary digits at the left. The first digit in the column is the prefix corresponding to the stability map of FIG. 15*a* in which $F_3=\cdot\dot{X}\cdot$. The second digit in each column is the prefix corresponding to FIG. 15*b* in which $F_3=\dot{X}$ and so on.

The overall reliability function R of the triplet "and" gate of FIG. 2 is obtained by adding the probabilities of each of the state combinations of the triplet which is favorable to the desired event, namely the production of an "and" function by the overall network. This requires the addition of 17 terms since there are 17 "one's" in the 64 binary digits of the prefixes. When this is done, the following equation is obtained:

$$R=2(1-p_o)^2p_o^2(1-p_o)^2+2(1-p_o)^2p_o(1-p_o)$$
$$+2(1-p_o)^4-(1-p_o)^6$$

which simplifies to:

$$R=(1-p_o)^3[1+5p_o-3p_o^2-p_o^3] \tag{21}$$

This equation may be compared with the reliability function of a single "and" gate which is:

$$R=(1-p_o)^2 \tag{22}$$

For the sake of comparison, the two equations above are plotted on the same graph of FIG. 17. Solid line 50 corresponds to Equation 22 and solid line 51 corresponds to Equation 21. The graph clearly indicates that there is considerable gain in the reliability of performing an "and" function when a single "and" gate is replaced by a redundant network consisting of a triplet of three "and" gates such as shown in FIG. 2.

It may be of interest to consider how the reliability of performance of an "and" function would be affected if the triplet of FIG. 1 consisted of the following stages.

Element 101 $F_1=\dot{X}$
Element 102 $F_2=\dot{X}$
Element 103 $F_3=\cdot\dot{X}\cdot$ ("or" gate)

The reliability of this network can be calculated in a manner quite similar to that described above and the equation which results is:

$$R=(1-p_o)^2[1-2p_o+9p_o^2-10p_o^3+5p_o^4] \quad (23)$$

This equation is plotted on the graph of FIG. 17 as solid line 52. Note that this arrangement is detrimental to the reliability of the performance of the "and" function.

RELIABILITY OF TRIPLET "OR" GATE OF FIG. 3

The reliability of the triplet "or" gate of FIG. 3 can be determined by a method quite analogous to that discussed in detail above. The chart which is obtained for the various logic states which are possible for a single "or" gate and the probability with which each state occurs is given below.

| | $D_1$ | $D_2$ | $F_1$ | Probability |
|---|---|---|---|---|
| (1)------ | g | g | $\cdot\dot{X}\cdot$ | $(1-p_s-p_o)^2$ |
| (2)------ | g | o | $\cdot\dot{X}$ | $p_o(1-p_s-p_o)$ |
| (3)------ | g | s | $\dot{X}\cdot$ | $p_s(1-p_s-p_o)$ |
| (4)------ | o | g | $\dot{X}\cdot$ | $p_o(1-p_s-p_o)$ |
| (5)------ | s | g | $\cdot\dot{X}$ | $p_o(1-p_s-p_o)$ |
| (6)------ | o | o | X | $p_o^2$ |
| (7)------ | s | s | $\dot{X}$ | $p_s^2$ |
| (8)------ | s | o | $\cdot\dot{X}$ | $p_op_s$ |
| (9)------ | o | s | X | $p_op_s$ |

Note in the table that a single "or" gate of the type within the dashed block 140 in FIG. 3 can assume one of five different logical states. These are listed under the $F_1$ column of the table. The probabilities of occurrences of the various logical states by a single "or" gate are given by the following equations:

$$p_1=p_{\cdot\dot{X}\cdot}=(1-p_s-p_o)^2 \quad (24)$$

$$p_2=p_{\cdot\dot{X}}=(p_o+p_s)-(p_o+p_s)^2+p_op_s \quad (25)$$

$$p_3=p_{\dot{X}\cdot}=p_{\cdot\dot{X}}=p_2 \quad (26)$$

$$p_4=p_{\dot{X}}=p_s^2 \quad (27)$$

$$p_5=p_X=p_o \quad (28)$$

In order to determine the reliability function for the overall triplet "or" network, it is necessary to construct five stability maps (one for each of the possible states of $F_3$) and a reliability matrix, each square of which includes prefixes just as in the matrix of FIG. 16. The overall reliability function R which is obtained from the reliability matrix by summing the conditional probability terms whose prefixes are "one" is $$R=(1-2p_o)^2[1+4p_o-13p_o^2+4p_o^3+6p_o^4] \quad (29)$$

The reliability of the single "or" gate without any redundancy is:

$$R=(1-2p_o)^2 \quad (30)$$

The two equations above indicate that the triplet network of FIG. 3 improves the overall reliability of the triplet network through the entire range of $p_o$. The two equations are plotted in the graph of FIG. 18 which is believed to be self-explanatory.

OTHER RELIABLE TRIPLETS OF FIRST ORDER

It has been shown above that resistor-diode "and" and "or" gate triplets have improved reliability. It can also be shown that other such triplets also have improved reliability. For example, all other one dot functions, namely $X\cdot$, $\underset{\cdot}{X}$, and $\cdot X$ may be arranged in triplets of identical elements to provide improved reliability. Similarly, all other three dot functions, namely $\underset{\cdot}{\dot{X}}\cdot$, $\cdot\underset{\cdot}{X}\cdot$, and $\cdot\dot{X}$ may be arranged in triplets of identical elements to provide improved reliability. The proof of these statements is quite lengthy and is not given here. However, one may obtain an intuitive feeling for the correctness of these statements by considering that all one dot functions are, in fact, "and" functions with inputs which are different than *a*, *b*. For example, $\underset{\cdot}{X}$ is the "and" function $\overline{ab}$. In like manner, all three dot functions are in fact "or" functions for different input quantities.

HIGHER ORDER TRIPLET NETWORKS

The discussion up to this point has been concerned with triplet networks of first order, that is, triplet networks consisting of three elementary logic elements arranged in the form of a convergent tree. It has been found that further gain in reliability of elementary logic operations may be obtained by redundant networks of higher complexity. For example, a second order triplet arrangement may be obtained as is shown in FIG. 19. Here, each element of the convergent tree consists of a triplet network of order one. Thus, the circuit in effect includes three triplets. By the same token, a third order triplet consists of three elements and in which each element is a triplet of second order. Such a network is shown in FIG. 20. It is also possible, of course, to provide triplet networks of fourth, fifth and higher orders. The way of doing this follows from the discussion above.

By using the method of analysis discussed in detail above, the following general equations may be derived for a network of order $n+1$ where $n$ is any integer, in which each of the elementary elements of the network is a simple "and" gate.

$$Q_{n+1}=2Q_nR_n^2+2Q_nR_n+2Q_n^2-Q_n^3$$
$$R_{n+1}=2R_n(Q_n-Q_n^2)+R_n^2(2-3Q_n)$$
$$P_n+Q_n+2R_n=1$$

where $Q_{n+1}$ is the probability that the overall network of order $n+1$ will produce the desired logic function, namely "and" ($\dot{X}$); $R_{n+1}$ is the probability that the overall network will produce the $\cdot\dot{X}$ function and this is equal also to the probability that the overall network will produce the $\dot{X}\cdot$ function; and $p_n$ equals the probability that the network of next lower order, namely of order $n$, would produce the $\cdot X\cdot$ function.

The graph of FIG. 21 is an indirect plot of the equations above. The abcissa $n$ is the order of the triplet. $\epsilon_n=1-Q_n$, where $\epsilon_n$ is the probability of error in a network of $n$'th order and $Q_n$ is the probability that the network of $n$'th order will produce the desired output function, namely $\dot{X}$. The ordinate is chosen to be $\log_{10} \epsilon_n$ instead of $\epsilon_n$ in order to improve the readability of the graph. The running parameter in the graph is $p_o$, the probability that a diode in the network will become open circuited. It will be recalled that the total probability of failure of a diode is $2p_o$ based on the reasonable assumption that $p_o=p_s$.

The graph shows that increasing the order of the triplet network up to a certain point provides improved reliability but thereafter the reliability deteriorates slightly. For all values of $p_0 \geqslant 0.025$ the maximum reliability (minimum error) of the network occurs at $n=4$. For values of $_0<p_0\leqslant 0.025$ the point of minimum error and maximum reliability occurs at $n=3$. However, for all values of $p_0$ show, the improvement in reliability from $n=2$ on is quite small. Accordingly, as a practical matter, $n=2$, that is, an "and" gate triplet of second order would be selected.

The equations for an "or" gate triplet of $n$'th order are:

$$Y_1(n+1)=Y_{1n}(1+2Y_{3n}+2Y_4n)+Y_{1n}^2(Y_{6n}-Y_{3n})$$
$$Y_5(n+1)=Y_4An+1)=2Y_{4n}Y_{6n}(Y_{1n}+2Y_{3n})+Y_{4n}^2(2+Y_{3n}+Y_{6n})$$
$$Y_6(n+1)=Y_{6n}^2(2+Y_{3n})+2Y_{6n}(Y_{4n}^2+Y_{4n})-Y_{6n}^2$$
$$Y_3(n+1)=1-Y_{1n}-2Y_{4n}-Y_{6n}$$

where $Y_1(n+1)$=the probability that a triplet network made up only of "or" elements and or order $n+1$ will produce the X function.

$Y_3(n+1)$=the probability that a triplet network made up only of "or" elements will produce $\dot{X}$.

$Y_4(n+1)$=the probability that a triplet network made up only of "or" elements will produce $\cdot\dot{X}$.

$Y_5(n+1)$=the probability that a triplet network made up only of "or" elements will produce $\dot{X}\cdot$.

$Y_6(n+1)$=the probability that a triplet network made up only of "or" elements will produce $\cdot\dot{X}\cdot$.

A graph showing these equations indirectly appears in FIG. 22. The graph is believed to be self-explanatory in view of FIG. 21. Here, as in the "and" network of order $n$ as a practical value, $n=2$ would be selected to give maximum error free performance.

What is claimed is:

1. A logic circuit comprising, in combination, three two-input, logic gates all performing the same logic function interconnected so that the outputs of the first and second gates serve as the inputs to the third gate, and the inputs to the first and second gates are connected to receive, in parallel, a common pair of input signals indicative of binary digits, each said gate comprising a pair of diodes, poled in the same direction, each diode of a pair of diodes receiving a different input signal indicative of a binary digit.

2. In the combination as set forth in claim 1, said diodes normally conducting and said input signals being applied in a sense to render them non-conductive.

3. In the combination as set forth in claim 1, said diodes normally being cut off and said input signals being applied in a sense to render them conductive.

4. A redundant logic circuit for performing the "and" logic function comprising, three two-input, resistor-diode "and" gates interconnected so that the outputs of the first and second gates serve as the inputs to the third gate, and the inputs to the first and second gates are connected to receive, in parallel, a common pair of input signals indicative of binary digits.

5. A redundant logic circuit for performing the "or" logic function comprising, in combination, three two-input, resistor-diode "or" gates interconnected so that the outputs of the first and second gates serve as the inputs to the third gate, and the inputs to the first and second gates are connected to receive, in parallel, a common pair of input signals indicative of binary digits.

6. A logic circuit comprising three substantially identical triplets, with the first and second connected to receive in parallel the same binary input signals, and the third connected to receive the output signals of the first and second triplets, each said triplet including three substantially identical logic elements, each performing the same logic function, the first and second of said elements being connected to receive, in parallel, the same input signals, and the third of said elements connected to receive the outputs of said first and second elements.

References Cited by the Examiner

UNITED STATES PATENTS

| | | | |
|---|---|---|---|
| 2,942,193 | 6/60 | Tryon | 328—92 |
| 2,950,461 | 8/60 | Tryon | 307—88.5 |
| 3,008,056 | 11/61 | Wanlass | 307—88.5 |
| 3,011,151 | 11/61 | Ketchledge | 328—92 |
| 3,069,562 | 12/62 | Steele | 307—88.5 |

ARTHUR GAUSS, *Primary Examiner.*

ROY LAKE, *Examiner.*

UNITED STATES PATENT OFFICE

CERTIFICATE OF CORRECTION

Patent No. 3,201,701 August 17, 1965

Karuna K. Maitra

It is hereby certified that error appears in the above numbered patent requiring correction and that the said Letters Patent should read as corrected below.

Column 8, line 24, for "(F=X)" read -- $(F=\dot{X})$ --; column 11, line 17, after "assume" insert -- under --; column 14, line 5, for "OR" read -- OF --; column 17, line 50, for "$a=a\bar{b}+ab$" read -- $\alpha=a\bar{b}+ab$ --; column 18, line 14, for " $\cdot\dot{X}\cdot$ " read -- $\underset{\cdot}{\cdot\dot{X}\cdot}$ --; column 20, line 9, for "$\dot{X}\cdot$ , $\cdot\dot{X}\cdot$" read -- $\underset{\cdot}{\dot{X}\cdot}$ , $\underset{\cdot}{\cdot\dot{X}\cdot}$ --; line 10, for " $\cdot\dot{X}$ " read -- $\underset{\cdot}{\cdot\dot{X}}$ --; line 55, for " $\cdot X\cdot$ " read -- $\underset{\cdot}{\cdot\dot{X}\cdot}$ --; column 21, line 6, for "$Y_5(n+1)=Y_4An+1)=$" read -- $Y_5(n+1)=Y_4(n+1)=$ --.

Signed and sealed this 18th day of October 1966.

(SEAL)
Attest:

ERNEST W. SWIDER
Attesting Officer

EDWARD J. BRENNER
Commissioner of Patents